US010344566B2

(12) United States Patent
Fraser et al.

(10) Patent No.: US 10,344,566 B2
(45) Date of Patent: Jul. 9, 2019

(54) METHOD FOR LAUNCHING A CLEANING ELEMENT

(71) Applicant: CORETRAX TECHNOLOGY LIMITED, Aberdeen (GB)

(72) Inventors: John Fraser, Aberdeen (GB); Cherish Bodman, Aberdeen (GB); Jason Fong, Aberdeen (GB)

(73) Assignee: Coretrax Technology Limited, Aberdeen (GB)

( * ) Notice: Subject to any disclaimer, the term of this patent is extended or adjusted under 35 U.S.C. 154(b) by 303 days.

(21) Appl. No.: 15/100,737

(22) PCT Filed: Jan. 27, 2015

(86) PCT No.: PCT/GB2015/050185
§ 371 (c)(1),
(2) Date: Jun. 1, 2016

(87) PCT Pub. No.: WO2015/114319
PCT Pub. Date: Aug. 6, 2015

(65) Prior Publication Data
US 2016/0305220 A1    Oct. 20, 2016

(30) Foreign Application Priority Data

Jan. 29, 2014 (GB) .................................. 1401490.6
Sep. 10, 2014 (GB) .................................. 1415970.1
Nov. 10, 2014 (GB) .................................. 1419993.9

(51) Int. Cl.
*B08B 9/055* (2006.01)
*E21B 37/10* (2006.01)
(Continued)

(52) U.S. Cl.
CPC .............. *E21B 37/10* (2013.01); *B08B 9/055* (2013.01); *B65D 65/46* (2013.01); *B65D 81/264* (2013.01); *E21B 37/08* (2013.01); *F16L 55/46* (2013.01)

(58) Field of Classification Search
CPC ......... B08B 9/055; E21B 37/08; E21B 37/10; B65D 65/46; B65D 81/264; F16L 55/46
See application file for complete search history.

(56) References Cited

U.S. PATENT DOCUMENTS 2,876,145 A    3/1959  Glenney
3,265,133 A *  8/1966  Burch .................... E21B 37/10
                                                    166/107

(Continued)

FOREIGN PATENT DOCUMENTS

EP    2075076 A1    6/2008
GB    2342971 A     4/2000
GB    2487434 B    12/2014

OTHER PUBLICATIONS

Combined Search and Examination Report from GB1501359.2 (counterpart), dated Jan. 29, 2016.

(Continued)

*Primary Examiner* — Alexander Markoff
(74) *Attorney, Agent, or Firm* — Gregory L. Porter; Hunton Andrews Kurth LLP

(57) ABSTRACT

A deformable cleaning element is encased within soluble packaging to maintain deformation. The deformed cleaning element is launched into the bore of a drill pipe/conduit or tubular. Contact with fluids within the bore dissolves the soluble packaging allowing the cleaning element to expand to its original shape.

12 Claims, 8 Drawing Sheets

(51) Int. Cl.
  *E21B 37/08*   (2006.01)
  *B65D 65/46*   (2006.01)
  *B65D 81/26*   (2006.01)
  *F16L 55/46*   (2006.01)

(56) References Cited

U.S. PATENT DOCUMENTS

| | | | |
|---|---|---|---|
| 3,879,790 A | 4/1975 | Girard | |
| 4,548,714 A * | 10/1985 | Kirwan, Jr. | B01D 67/0097 210/232 |
| 5,113,544 A * | 5/1992 | Webb | F16L 55/38 15/104.061 |
| 5,935,366 A | 8/1999 | Wood | |
| 6,220,356 B1 * | 4/2001 | Spikes | E21B 27/02 166/162 |
| 6,802,909 B1 | 10/2004 | Crenshaw | |
| 2011/0277255 A1 * | 11/2011 | Harper | B08B 9/0557 15/104.061 |
| 2014/0283876 A1 * | 9/2014 | Fjerdingstad | B08B 9/0535 134/8 |
| 2017/0299108 A1 * | 10/2017 | Perstnev | B08B 9/055 |

OTHER PUBLICATIONS

Examination Report from GB1501359.2 (counterpart), dated Apr. 25, 2016.
PCT Search Report (PCT/GB2015/050185), dated Jun. 29, 2015.

* cited by examiner

METHOD FOR LAUNCHING A CLEANING ELEMENT

The present invention relates to a wellbore cleaning element, and to a method of launching a cleaning element into a pipe. The pipe can comprise a drill pipe or tubular used in oil and gas drilling and recovery operations. The invention relates to a process of cleaning and removing residual debris from a pipe such as a drill pipe or oil well tubular. The invention also relates to reversible sustained compression of a cleaning element to ease loading into a pipe.

BACKGROUND TO THE INVENTION

Following the drilling of a wellbore, it is necessary to ensure that the drill pipe or tubular is free from any debris, particularly after cementing operations. Typically this is performed by pumping foam rubber elements, known as wiper balls, from the surface through the bore of the drill pipe or tubular. The cleaning elements characteristically have a larger diameter than the pipe undergoing cleaning in order to create a friction fit. In some cases it may be necessary to pass more than one cleaning element through the bore to achieve sufficient clearance of the debris in the bore. The force required to launch such a cleaning element into a pipe can be extremely large, leading to a risk of injury, and an inefficient and time-consuming loading process.

SUMMARY OF THE INVENTION

According to the present invention there is provided a method for deforming a cleaning element for launching into a pipe, the method comprising:
  mechanically deforming the cleaning element;
  encasing the deformed cleaning element in soluble packaging to maintain deformation of the cleaning element; and
  launching the deformed cleaning element into the pipe.

Optionally the cleaning element has a spherical form or dart arrangement before deformation. Optionally the cleaning element takes on an ellipsoid or ovoid form under deformation, optionally an ellipsoidal cylinder. Optionally the cleaning element takes on a barbell form under deformation. The ellipsoid or ovoid form can be symmetrical or asymmetrical. While some deformed encased cleaning elements are symmetrical around a long axis, others can be asymmetrical.

Optionally the encasing packaging can be a soluble film, which may be a polymeric water soluble material, and may comprise for example polyvinyl alcohol. Other water soluble materials can be used for the soluble film such as polyethylene oxide. Suitable materials are well known in the art and commercially available from Proudly Inc. The film material can optionally include plasticisers or other additives.

The cleaning element can optionally be deformed by compression, optionally using a mechanical packaging device to compress the cleaning element before or during encasement in the packaging. Optionally the packaging device comprises at least one roller device to compress the cleaning element, and optionally has a set of at least two rollers. Optionally more than one pair of rollers is provided, for example, 2, 3, 4, 5 or more pairs of rollers which are arranged in sequence to apply increasing compression to the cleaning element along the sequence. Optionally the rollers decrease the diameter of the cleaning element by passing the cleaning element between sequential pairs of mechanical rollers. Optionally the distance between each roller in each sequential pair gradually decreases, thereby increasing the deformation of the cleaning element as the cleaning element passes through the sequence of rollers. Optionally the rollers are arranged in a converging vertical sequence. Optionally the pairs of rollers acting to apply increasing compression are on parallel axes. Optionally the rollers have sequentially changing diameters.

Optionally encasement of the cleaning element occurs after the cleaning element has been deformed, or during the deformation step. Optionally this is after the cleaning element has passed through at least two pairs of rollers. Optionally the encasement of the cleaning element acts to deform the cleaning element.

Optionally there can be more than one encasement event. In one embodiment, the deformed cleaning element passes through at least one pair of rollers and is encased in one layer of soluble film, before passing through at least one other pair of rollers and being encased in another layer of soluble film. This process can be repeated as often as necessary to build up 2, 3, 4 or more layers of film. Subsequent film layers after the first can be formed from different pieces of film, or can optionally be formed from the same piece of film material overlaid on lower layers. Optionally the rollers act to encase the deformed cleaning element in soluble film by feeding the film through the rollers. Optionally this encasement occurs during the process of deformation of the cleaning element by the rollers. Optionally the apparatus comprising the rollers comprises a folding device that folds a free end of the soluble film back over the deformed cleaning element for encasement. Optionally the apparatus comprising the rollers comprises a sealing device, which may be a heat sealing device, to seal the soluble film and resist resilient return of the deformed cleaning element to its original state.

Optionally the application of the soluble film can compress the cleaning element, either as part of the packaging steps that take place in the packaging device, or as a stand-alone step. The wrapping of the soluble film around the cleaning element can compress and deform the cleaning element into the deformed configuration.

Optionally the solubility of the soluble packaging can be optimised for the temperature of the environment in which it is being used. For example, the soluble packaging can be adapted to dissolve in fluid (e.g. water or other fluid, e.g. drilling fluid, brine etc. used to pump the cleaning elements through the bore of the pipe) at a particular temperature, and to resist loss of integrity of the film at a different temperature. Hence, in certain examples, the speed of loss of integrity of the soluble packaging can be temperature dependent, and the method can include adjusting the temperature to a particular range to trigger or to promote the loss of integrity, and/or to prevent or reduce the rate of loss of integrity.

Optionally the soluble packaging is flexible. Optionally the soluble packaging has tensile resistance, sufficient to resist extension of the soluble packaging material as a result of the resilience of the cleaning element. Optionally the soluble packaging resists radial expansion of the cleaning element until the integrity of the soluble packaging material is diminished by dissolving in the fluid.

Optionally, once the cleaning element has been deformed and encased, it can be launched into the tubular, optionally by hand. Optionally this means it can be dropped axially into the bore of the tubular. Once the deformed cleaning element is within the bore, contact with fluids in the bore reduce the integrity of the packaging around the cleaning element, which leads to the soluble material dissolving and a resultant expansion of the cleaning element such that it is in contact with the surrounding walls of the tubular.

Optionally the deformed, encased, cleaning element can be encased in a transportation container. The transportation container can optionally be tubular, for example cylindrical, with a bore having at least one open end through which the cleaning element can be inserted into the tube. The tube can optionally have a smaller internal dimension e.g. a smaller internal diameter, than the pipe in which the cleaning element is to be used. Optionally the transportation container contains a moisture absorbing device, adapted to absorb the moisture in the container and prevent or reduce premature loss of integrity of the soluble packaging within the container. A suitable moisture absorbing device can comprise silica.

Optionally the transportation container can hermetically seal around the deformed cleaning element, for example by having endcaps at least at one and optionally at each end of the transportation container. The endcaps can optionally have seals, e.g. o-rings. The transportation container can optionally form part of a launching apparatus, and the cleaning element can optionally be launched form the transportation tube. Optionally a launcher can be inserted into the bore of the transportation container to push the deformed cleaning element out of the opposite end of the transportation container, and into the bore of the tubular. The launcher can comprise a smaller diameter tube, or similar.

The cleaning element can be inserted into the transportation tube after wrapping the cleaning element with the soluble packaging or alternatively, in some examples, the transportation tube can optionally comprise the soluble packaging.

Optionally the deformed cleaning element can be encased in a rigid soluble packaging. For example, the rigid soluble packaging can comprise a tube such as the transportation tube, which can be launched into the bore of the plate to be cleaned. In such examples, the rigid soluble packaging can optionally comprise a preformed tube into which the cleaning element is pressed either after or during the deformation of the cleaning element. The rigid soluble packaging optionally surrounds the compressed cleaning element and maintains the deformed configuration of the cleaning element as previously described in relation to the flexible examples of soluble packaging. Like the earlier examples, the rigid soluble packaging dissolves or loses integrity upon exposure to the fluid within the bore of the pipe to be cleaned, allowing expansion of the cleaning element once within the bore.

In another example, the soluble packaging can optionally be formed around the deformed cleaning element in a malleable state when the cleaning element is in the deformed configuration, and can subsequently set to a non-malleable rigid state to form a rigid soluble packaging. The rigid soluble packaging material in such examples can optionally comprise for example sugar glass.

The rigid soluble packaging optionally has a smaller diameter than the pipe to be cleaned.

Optionally, once the cleaning element has passed through the sets of mechanical rollers, the deformed cleaning element is inserted into the rigid soluble packaging. Optionally the rigid soluble packaging is formed around the deformed cleaning element using a mould. The deformed cleaning element then optionally passes through the sets of mechanical rollers and is optionally held in the compressed state by, for example, a supporting structure such as a cylindrical support tube. The material of the tube is optionally a low friction type material. The rigid soluble packaging is optionally formed around this low friction tube, optionally by pouring or spraying a liquefying material. Once set, the support tube can optionally be removed by sliding away between the compressed cleaning element and rigid soluble packaging, leaving the compressed cleaning element encased within the rigid soluble packaging. Optionally the rigid soluble packaging comprises a material that has a solubility that is optimised for the temperature of the environment in which it is being used. Optionally the deformed cleaning element can undergo encasement with soluble film prior to insertion into the rigid soluble packaging.

Optionally the cleaning element encased in the rigid soluble packaging can be dropped axially into the tubular by hand, and/or contained within a launching apparatus and launched into the bore from the launching apparatus. Optionally the example encased in rigid soluble packaging can be transported in and optionally launched from a transportation container as described above.

Optionally the cleaning element comprises a rubber compound.

Optionally the soluble packaging dissolves after launch, allowing the cleaning element to expand radially within the bore of the pipe into contact with the inner wall of the bore of the pipe. Optionally the cleaning element is compactable. Optionally the cleaning element is resilient and returns to the original shape after the dissolution of the soluble packaging maintaining the deformed shape. Optionally the original shape recovered by the cleaning element has a larger dimension, e.g. a diameter, than the pipe in which it is to be used. Optionally the cleaning element is spherical, but could optionally be cylindrical, dart shaped or similar.

The cleaning element is optionally compressed to a smaller diameter than the drill pipe/conduit or tubing. The cleaning element is optionally a spherical or a cylindrical or a dart shaped element. The cleaning element can be compressed within a tube which has a smaller internal diameter than the drill pipe/conduit or tubing in which it will be used. The tube can be formed of a plastics material. The tube with the compressed cleaning element can act as transportation packaging as well as a launching device. The cleaning element can be launched from the tube by plunging. For example, by inserting a smaller diameter plunger (for example a smaller tube or similar) into the tube containing the compressed cleaning element and pushing the compressed cleaning element out of the tube. The tube can be sealed to prevent any moisture or debris making contact with the compressed cleaning element.

The soluble packaging is optionally strong enough to retain the compressed cleaning element. The soluble packaging optionally dissolves on contact with fluid, for example drilling fluids, brine, or fresh water, and will allow the cleaning element to expand out to the internal diameter of the drill pipe/conduit or tubing, against the inner wall. The packaging on the compressed cleaning element can be flexible or rigid. The packaging can comprise a bag, tube, box or a combination of these.

The packaging device optionally uses mechanical force to compress the cleaning element and can comprise pneumatic, hydraulic, or electrical devices. The packaging device may comprise a sealing device for sealing the soluble packaging once the cleaning element has been fully compressed. The packaging device can comprise a fixing device to fix the soluble packaging in place around the compressed cleaning element to prevent the cleaning element from expanding back to its original shape. The fixing device (and optionally the sealing device) can comprise a heat sealing device, used to heat seal the soluble packaging.

The packaging device may comprise an ejector device to release the compressed cleaning element from the packaging device once it has been packaged. This can for example a mechanical plunger.

The invention also provides apparatus for deforming a cleaning element for launching it into a pipe, the apparatus comprising a device for mechanically deforming the cleaning element; and
soluble packaging that encases the deformed cleaning element to maintain deformation.

The invention also provides a cleaning element for cleaning a pipe, the cleaning element comprising a resilient material adapted to be deformed from an expanded resting configuration having a first dimension to a second deformed configuration having a second dimension smaller than the first dimension, the cleaning element being encased with a packaging to maintain deformation of the cleaning element in the deformed configuration, wherein the packaging is soluble.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one example can optionally be combined alone or together with other features in different examples of the invention.

Various examples and aspects of the invention will now be described in detail with reference to the accompanying Figures. Still other aspects, features, and advantages of the present invention are readily apparent from the entire description thereof, including the Figures, which illustrate a number of exemplary aspects and implementations. The invention is also capable of other and different aspects and implementations, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope.

Language such as "including," "comprising," "having" "containing" or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or is preceding the recitation of the composition, element or group of elements and vice versa.

All numerical values in this disclosure are understood as being modified by "about". All singular forms of elements, or any other components described herein are understood to include plural forms thereof and vice versa.

BRIEF DESCRIPTION OF THE DRAWINGS

In the accompanying drawings.

DESCRIPTION OF ONE OR MORE EXAMPLES OF THE INVENTION

Figure 1:
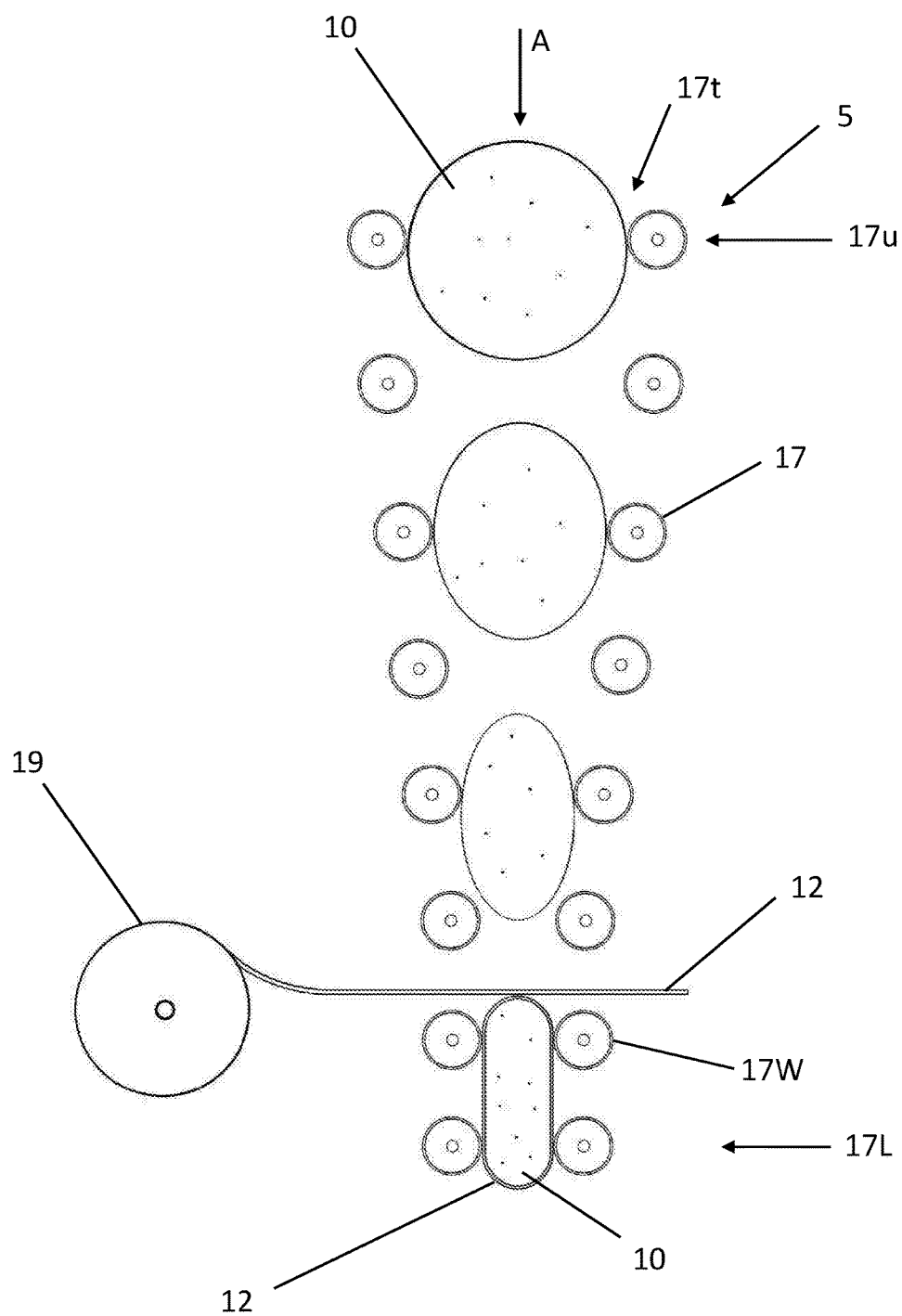
FIG. 1 is a schematic side view of a roller sequence in a packaging device compressing a cleaning element and wrapping it in a single roll of soluble film.

FIG. 1 shows a schematic side view of one possible packaging device 5 used to compress a cleaning element 10 into an ovoid shape having approximate symmetry around the long axis, before wrapping the film 12 around the compressed cleaning element 10. The cleaning element 10 optionally comprises a spherical ball of resilient material such as rubber having a larger outer diameter than the pipe in which it is to be used. The ball 10 is encased within flexible soluble film 12, which is wrapped around the outer surface of the ball 10 by the packaging device 5. The film 12 in this example comprises a polyvinyl alcohol material.

The packaging device 5 comprises a throat 17t having sequence of vertically separated pairs of mechanical rollers 17 which are optionally mounted on horizontal axles and are mutually parallel, and in which each pair of rollers 17 are spaced from one another laterally in the same horizontal plane. The lateral spacing between each pair of rollers 17 is optionally not consistent between different pairs, and the rollers 17u in the pairs at the upper end of the throat (closer to the open end) are optionally spaced apart from one another by a larger spacing than the rollers in the pairs 17l at the lower end of the sequence. The spacing between adjacent pairs gradually decreases along the sequence. The throat 17t is arranged vertically in this example, with the opening of the throat 17t at the upper end, and this helps to feed the cleaning element 10 into the throat 17t but this is not necessary in all examples.

The cleaning element 10 is passed through the throat 17t in the direction of the arrow A. This can be accomplished by a feed mechanism which pushes the cleaning element 10 through the throat 17t, or the rollers 17 can be driven in rotation in opposite directions around the axles, for example by pneumatic, hydraulic, or electric drivers, and can draw the cleaning element into the throat 17t. As the cleaning element 10 proceeds along the roller sequence in the throat 17t, the diameter of the cleaning element 10 is reduced as the distance between each roller in each sequential pair gradually decreases, thereby increasing the deformation of the cleaning element as it moves down the sequence of rollers lining the throat. Optionally also, the diameter of the rollers 17 changes, e.g. increases along the sequence. Therefore, as the cleaning element 10 moves down the sequence of rollers 17 in the deformation apparatus 5, the cleaning element 10 is deformed from its initial generally spherical shape shown at the upper end of the sequence, to the ellipsoid or ovoid shape shown at the lower end of the sequence.

Optionally, the packaging device 5 incorporates a wrapping device. The deformed cleaning element 10 is optionally also wrapped in the throat 17t of the packaging device 5 by at least one layer of soluble film 18 as the deformed cleaning element 10 is passed between a pair of narrowly spaced rollers 17w located at an optional wrapping device optionally at the lower end of the sequence in this example, but could be arranged at any location in the sequence, optionally after the cleaning element has started to deform at least partially. The wrapping device comprises at least one roll of film 12 held on at least one spool 19 adjacent the rollers 17w.

As the deformed cleaning element 10 passes between the rollers 17w, the spool 19 unwinds a length of film 12 and encases the deformed ovoid cleaning element 10 in at least one layer of the soluble film 12. In this example, only one layer of soluble film 12 is wrapped around the deformed cleaning element 10, but in other examples, more than one layer of film can be wrapped at this stage. Optionally subsequent layers can be wrapped from the same roll of film, but also in other examples, additional sets of rollers 19 and additional rolls of soluble film 12 can be provided for the extra layers of film wrapped around the compressed cleaning element such that the deformed cleaning element 11 is encased in more than one layer of soluble film 12.

Optionally, the wrapping device also folds the layer of soluble film 12 around the compressed deformed cleaning element 10 while it is in the deformed configuration. Optionally the wrapping device incorporates a securing element which secures the soluble film around the deformed cleaning element 10 in order to maintain the deformed configuration of the cleaning element 10, and to resist radial expansion of the deformed cleaning element out of the ovoid configuration. Optionally the securing element seals the film around the compressed deformed cleaning element 10. Optionally, the sealing element comprises a heating element, which heat seals at least one seam of the film 12 to create a barrier around the cleaning element. Optionally, the sealing element hermetically seals the film 12 around the deformed cleaning element 10, and resists passage of air through the sealed film 12. However, in some other examples, the deformed cleaning element need not be hermetically sealed, and it is sufficient that, for example, a band of film 12 is wrapped around at least a portion of the outer circumference of the cleaning element in order to maintain at least some deformation of the cleaning element, sufficient to allow passage of the deformed cleaning element into the bore of the pipe to be cleaned.

Figure 2:
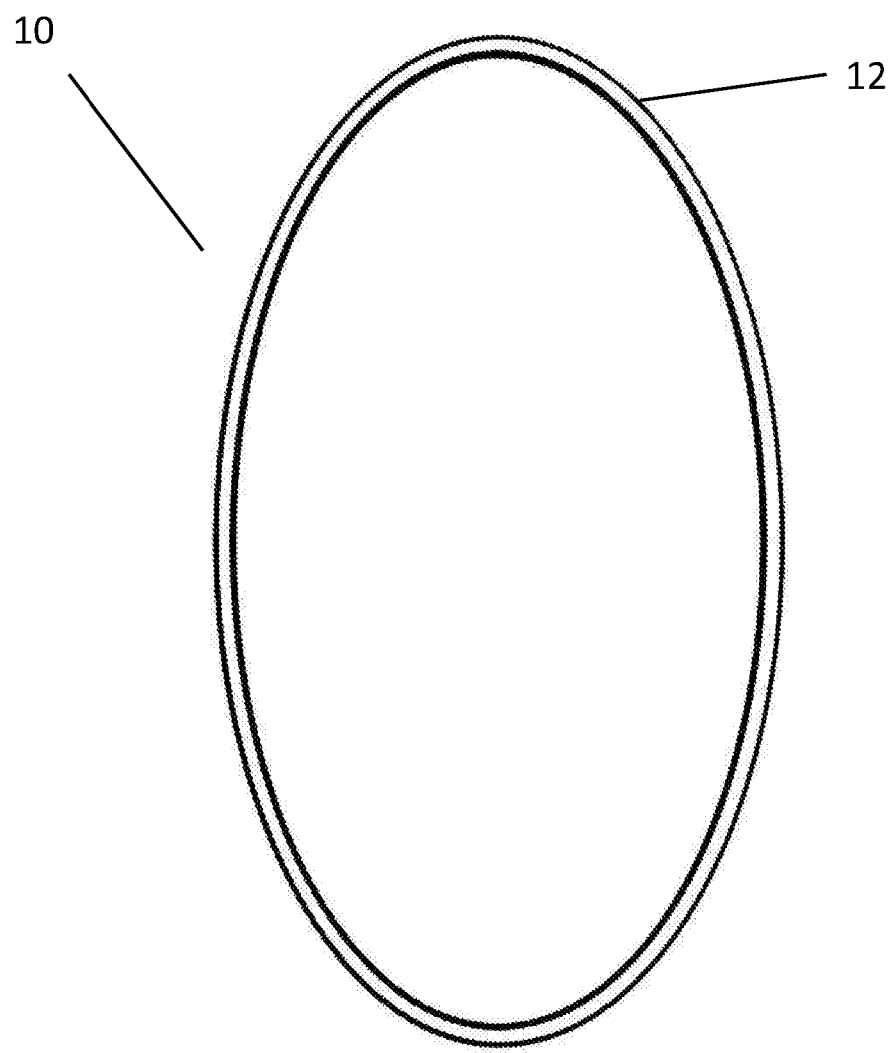
FIG. 2 is a schematic side view of a deformed cleaning element encased in soluble film after being compressed in the packaging device of FIG. 1.

While in the resting uncompressed configuration, the cleaning element 10 was substantially spherical (see initial sequence in FIG. 1), but it has been compressed into an ovoid configuration shown in FIG. 2, which is maintained by the wrapping of the flexible soluble film 12. The encasement by the flexible soluble film 12 maintains deformation of the cleaning element 10 in the ovoid configuration until the soluble film 12 comes into contact with fluid that is capable of dissolving the soluble film 12 as will be explained below.

Figure 3:
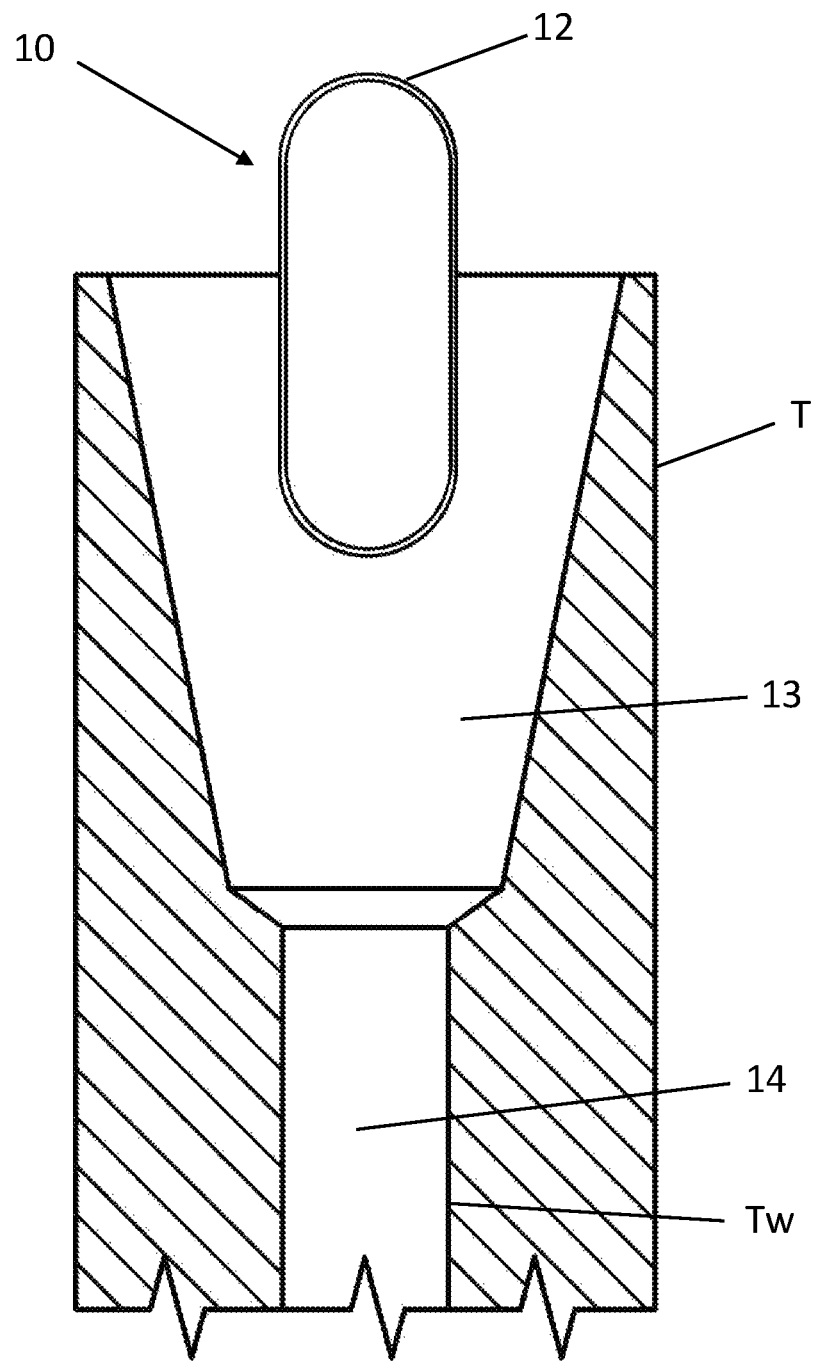
FIG. 3 is a schematic side view of the deformed cleaning element encased in soluble film being launched into a tubular by dropping it into the bore.

FIG. 3 shows a side view of a deformed, encased cleaning element 10 in the ovoid configuration that has been generated by the packaging device 5 being launched into the box end 13 of a tubular T having an inner wall Tw to be cleaned. The element 10 is dropped into the box end 13 such that it is axially aligned with the bore 14 of the tubular T. This can optionally be accomplished by simply dropping the deformed encased cleaning element 10 into the wide diameter bore of the box end 13. Note that the outer diameter of the ovoid configuration of the cleaning element 10 is slightly narrower than the bore 14 of the tubular T, so held in the ovoid configuration by the film 12 can pass relatively easily into the bore 14 of the tubular T without requiring excessive force to deform the cleaning element 10 much further. Note that in certain examples of the invention, it is acceptable for the outer diameter of the cleaning element tend to be slightly more than the inner diameter of the bore 14 of the tubular T, and as long as the deformed encased cleaning element 10 can be dropped satisfactorily into the wide diameter of the box end 13, it can be flushed into the bore 14 by a fluid pressure differential.

Figure 4:
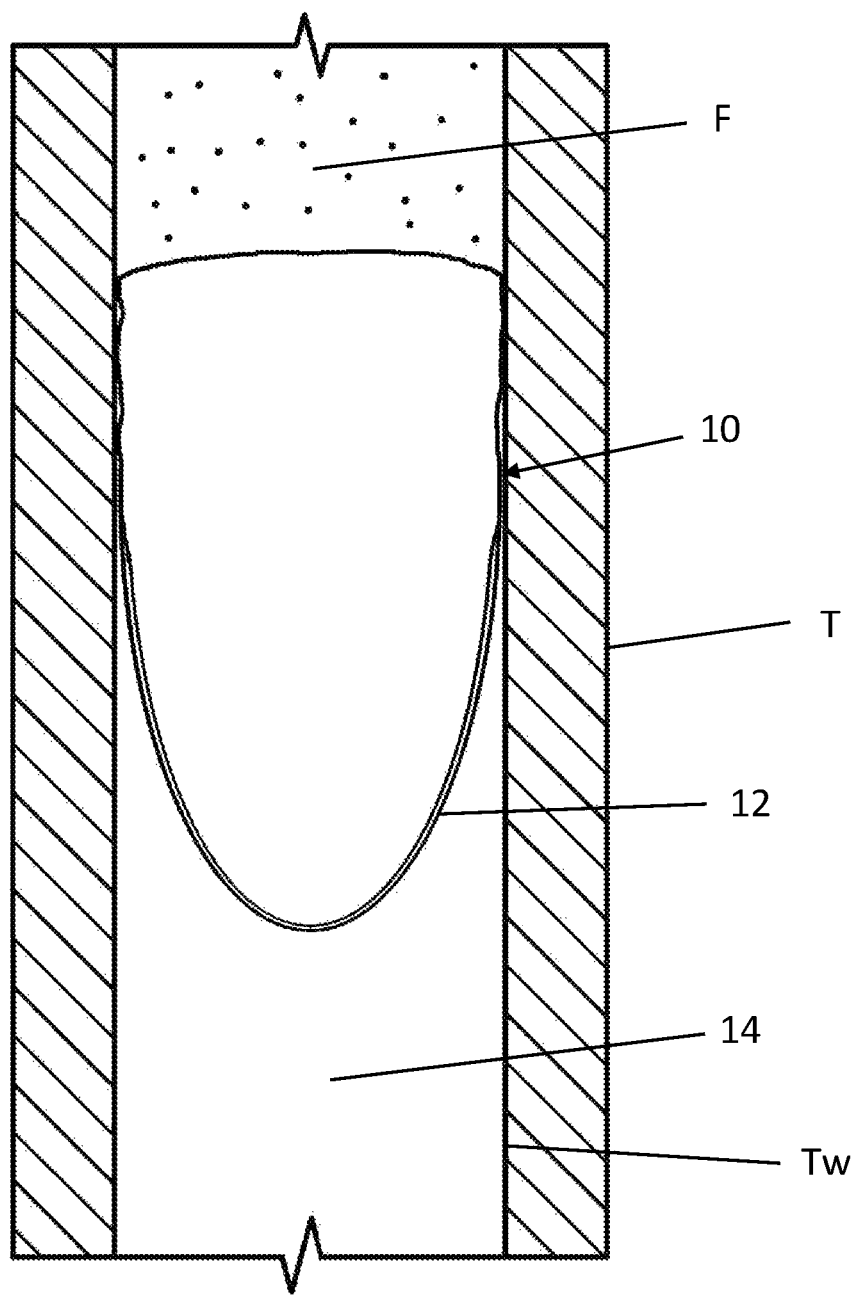
FIG. 4 is a schematic side view of the FIG. 1 deformed cleaning element in situ within the bore, where one side of the element is in contact with fluid and the soluble packaging has dissolved.

Once the deformed encased cleaning element 10 has been flushed into the bore 14 by fluid F (which in this example is water), the fluid F within the bore 14 that contacts the film 12 on the outer surface of the deformed encased cleaning element 10 will start to dissolve the film 12 and reduce its integrity to the extent that it no longer maintains the deformed ovoid configuration, and eventually gives way to allow unrestrained radial expansion of the cleaning element 10 within the bore 14 under the force of its own natural resilience that was being restrained by the film 12 prior to loss of film integrity. FIG. 4 is a side view of the deformed cleaning element 10 encased in soluble film 12, in situ in a bore 14. The upper end of the deformed cleaning element 10 is in contact with the flushing fluid F and the soluble film 12 on the side of the deformed cleaning element 10 that is in contact with the fluid F has dissolved, and the upper end of the cleaning element 10 has resiliently expanded to fill the bore and press the outer diameter of the cleaning element 10 against the inner surface of the wall Tw of the tubular T. The resilience of the cleaning element 10 exert a radial force against the inner surface of the wall Tw, and as the cleaning element 10 travels axially within the bore 14 through the pressure of the flushing fluid F, the inner surface of the wall Tw is cleaned of debris.

Figure 5:
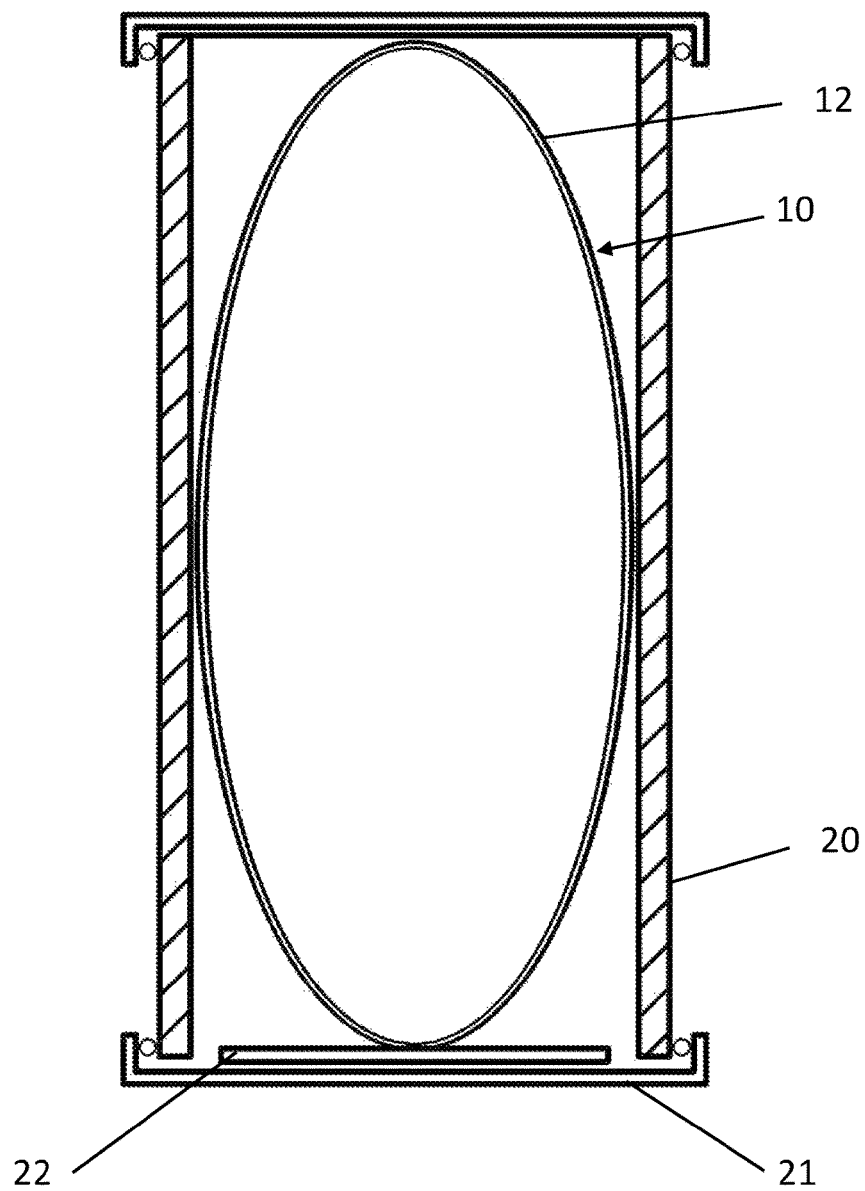
FIG. 5 is a schematic side view of a deformed cleaning element wrapped in soluble film and disposed in a transportation container.

Optionally, the deformed encased cleaning element 10 can be transported to the well within a transport container, which can optionally be sealed in order to avoid degradation of the soluble film 12 as a result of moisture ingress into the transport container. In FIG. 5, there is schematically shown one example of a transport container in the form of a plastic tube 20, which can optionally have removable end caps 21, which can be secured by threaded connections between the end caps 21 on the ends of the tube 20, or can be secured by a simple push fit. Optionally, the end caps 21 are sealed to avoid moisture ingress into the tube 20 during transport. The end caps 21 can be removed from the tube 20 before launching of the deformed encased cleaning element 10 into the well. Optionally, the tube 20 can include moisture absorbing device 22, optionally in the form of a silica pad, which binds moisture within the sealed tube 20, and reduces the risks of premature expansion of the cleaning element 10 by loss of integrity of the film 12 as a result of moisture ingress during transport.

Figure 6:
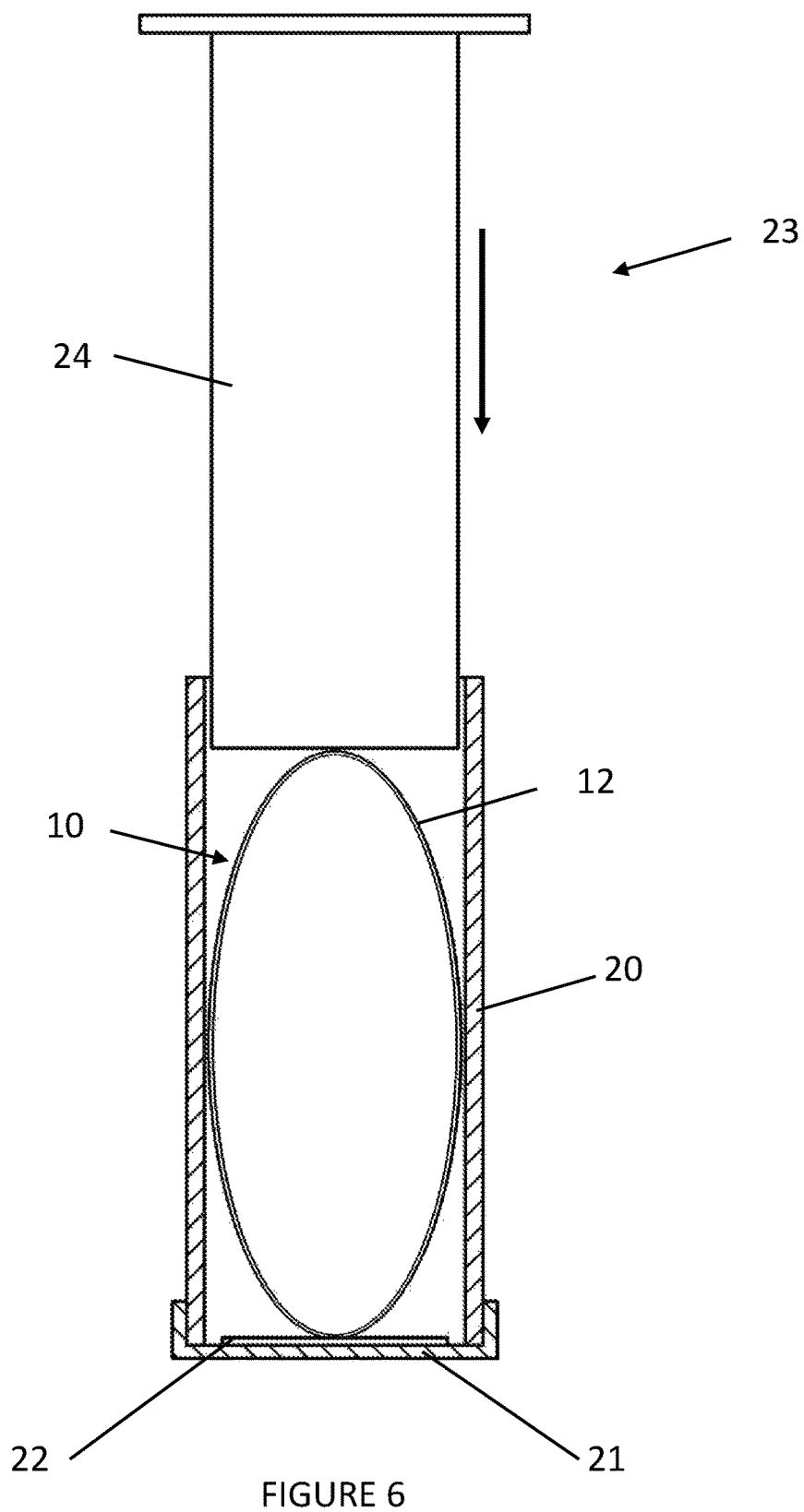
FIG. 6 is a schematic side view of a transportation container and launching apparatus used for transporting the FIG. 1 deformed cleaning element.

FIG. 6 is a schematic side view of a launching apparatus 23. The apparatus 23 comprises a transportation container 20, within which the encased deformed cleaning element 10 is contained. The transportation container 20 optionally encloses the encased deformed cleaning element 10 by removable sealed endcaps 21 and also comprises a moisture absorbing device 22.

The launching apparatus 23 also includes a launcher 24 to launch the element 10 from the tube 20. The launcher 24 in this example takes the form of a small diameter tube, optionally having closed ends, that fits within the inner diameter of the tube 20 of the transportation container. By optionally removing the upper and lower endcaps 21 and pressing the closed ended launcher 24 into the bore of the tube 20 of the transportation container, the encased deformed cleaning element 10 is pushed out of the opposite end of the tube 20 and into the tubular. Since the film 12 restrains the deformed encased cleaning element 10 against radial expansion within the tube 20, the force required to push the cleaning element 10 from the tube 20 for launch is not excessive. Optionally, in this example, the tube 20 is formed of plastics material, which is resistant to the permeation of water, and which maintains a dry environment within the bore of the tube 20, to avoid premature activation of the cleaning element 10.

Figure 7:
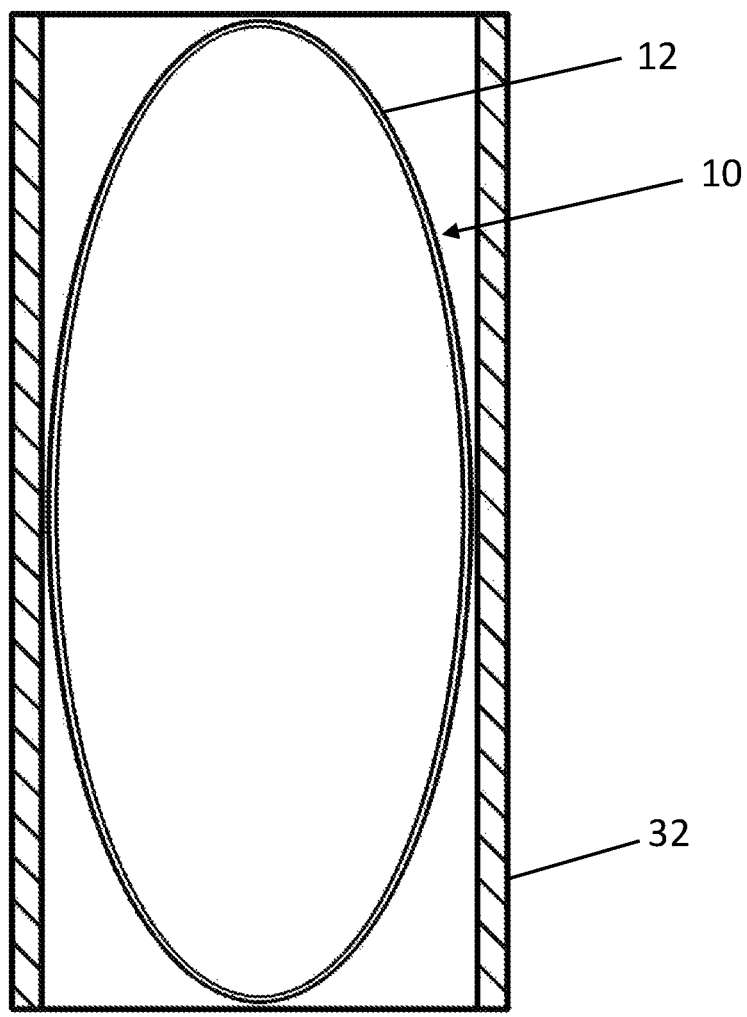
FIG. 7 is a schematic side view of the deformed cleaning element encased in both soluble film and rigid soluble packaging.

In a modified example, shown in FIG. 7, the deformed cleaning element 10 can be encased in soluble film 12 and then further encased in rigid soluble packaging 32. This element 10 can be launched into a tubular either using a launching device or by axially aligning the encased element with a bore and dropping the element into the bore. The rigid soluble packaging can optionally comprise a tube of sugar glass or polyvinyl alcohol. The rigid sugar glass or polyvinyl alcohol tube maintains a consistent outer diameter, which can be controlled to a dimension that is less than the inner diameter of the bore of the pipe to be cleaned. The rigid tube is dissolved in the same manner as the soluble film in the previous example by contact with the fluid within the bore of the pipe being cleaned. Once the structural integrity of the rigid soluble packaging and the wrapped film 12 has been degraded to a sufficient extent, the cleaning element 10 expands radially to fill the bore as previously described, and is flushed down the bore by a pressure differential in the fluid.

Figure 8:
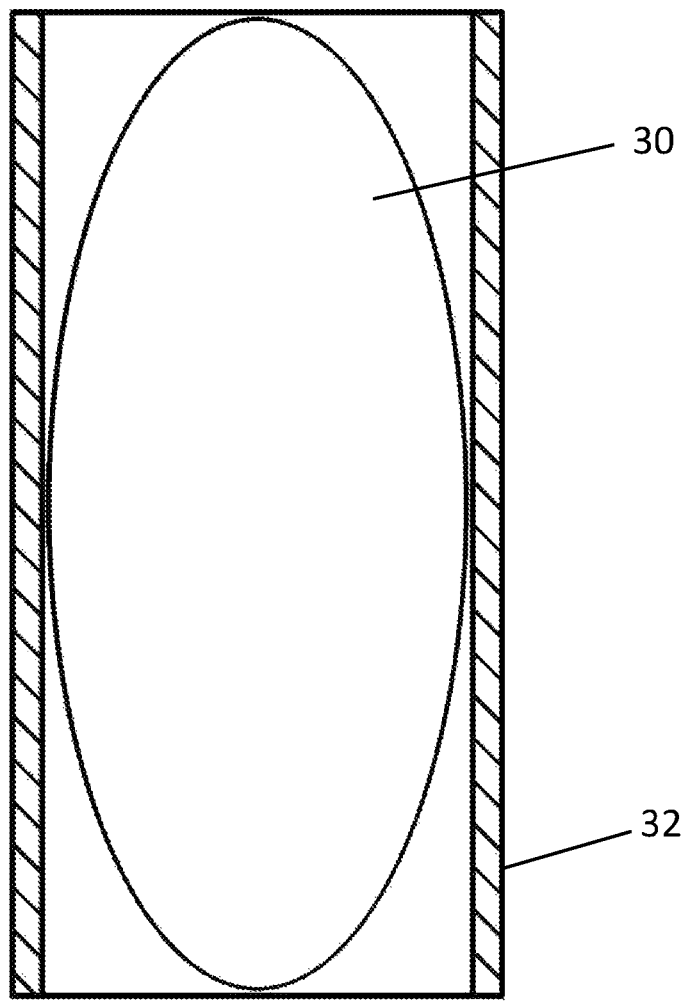
FIG. 8 is a schematic view of a deformed cleaning element encased in a rigid soluble container.

In a further modified example, FIG. 8 shows a schematic side view of a deformed cleaning element 30 encased within a rigid soluble housing 32. The encasement maintains deformation of the cleaning element 30 until the rigid soluble housing 32 comes into contact with fluid. The rigid soluble packaging can optionally comprise a generally tubular structure of sugar glass or polyvinyl alcohol. The rigid sugar glass or polyvinyl alcohol housing 32 maintains a consistent outer diameter, which can be controlled to a dimension that is less than the inner diameter of the bore of the pipe to be cleaned. The rigid soluble housing 32 is dissolved in the same manner as the soluble film in the previous example by the fluid within the bore of the pipe being cleaned. Once the structural integrity of the rigid soluble housing 32 has been degraded by the fluid in the bore to a sufficient extent, the cleaning element 30 expands radially to fill the bore as previously described, and is flushed down the bore in its expanded state by pressure differential in the fluid across the cleaning element 30.

Optionally, in this example, the cleaning element 30 can be compressed into the deformed configuration before application of the housing 32. Optionally, the housing 32 can be pre-formed in the tubular shape, but in this example, the cleaning element is optionally compressed into the deformed configuration by a cage or similar structure which surrounds the cleaning element 30 on some of its external surface, but not all of it, and maintains the deformed configuration while the housing is formed around the external surface of the deformed cleaning element 30. This can optionally be done in some examples by liquefying material forming the housing, and pouring or spraying the liquefied material onto the deformed cleaning element held by the cage. In some examples, the liquefied material can comprise polyvinyl alcohol, or sugar glass, which can be poured in liquid form over the caged compressed cleaning element and can be left to set into a solid state in order to constrain the deformed configuration of the cleaning element 30 and resist its radial expansion. Optionally, the cage can be removed, leaving the set housing 32 in place. Thus, the housing 32 and deformed compressed cleaning element 30 can be launched into the bore of the pipe, which is wider than the outer diameter of the tubular housing 32, and the resilient cleaning element 30 can expand radially within the bore of the pipe as previously described upon contact with fluid within the bore.

Further modifications and improvements may be made to the embodiments hereinbefore described without departing from the scope of the invention.

The invention claimed is:

1. A method of cleaning a pipe using a deformable cleaning element, the pipe having a bore with an axis, the method comprising:
    mechanically deforming the cleaning element;
    encasing the deformed cleaning element in flexible soluble packaging to maintain deformation of the cleaning element;
    launching the encased deformed cleaning element into the pipe while encased in the flexible soluble packaging;
    releasing the cleaning element from the flexible soluble packaging in the pipe by dissolving the flexible soluble packaging in the fluid in the bore and permitting the cleaning element to expand in the pipe; and
    cleaning the pipe by axially moving the expanded cleaning element through the bore of the pipe.

2. A method as claimed in claim 1, further comprising deforming the cleaning element into an ovoid form before encasing the cleaning element in the soluble packaging.

3. A method as claimed in claim 1, further comprising deforming the cleaning element by passing between a set of at least two mechanical rollers.

4. A method as claimed in claim 3, further comprising decreasing the diameter of the cleaning element by passing the cleaning element between sequential pairs of mechanical rollers, wherein the spacing between the two rollers in each pair decreases with each pair in the sequence.

5. A method as claimed in claim 4, further comprising applying the flexible soluble packaging to the deformed cleaning element during the passage of the cleaning element through the mechanical rollers.

6. A method as claimed in claim 1, further comprising fastening the flexible soluble packaging against expansion of the cleaning element once the cleaning element is deformed.

7. A method as claimed in claim 1, further comprising transporting the deformed cleaning element within a transportation tube, the transportation tube having a smaller diameter than the inner diameter of the pipe to be cleaned.

8. A method as claimed in claim 1, further comprising inserting the deformed cleaning element into a launch tube and launching the deformed cleaning element from the launch tube by pressing a launcher into the launch tube, pushing out the deformed cleaning element from the launch tube.

9. A method as claimed in claim 1, further comprising launching the deformed cleaning element by positioning it axially in line with the bore of the pipe to be cleaned, and releasing the deformed cleaning element into the pipe.

10. A method as claimed in claim 1, further comprising wrapping the flexible soluble packaging around the deformed cleaning element.

11. A method as claimed in claim 10, wherein the flexible soluble packaging has a tensile resistance sufficient to resist extension of the flexible soluble packaging material as a result of the resilience of the cleaning element.

12. A method for deforming a cleaning element for launching into a pipe, the method comprising:
- mechanically deforming the cleaning element;
- encasing the deformed cleaning element in soluble packaging to maintain deformation of the cleaning element;
- launching the encased deformed cleaning element into the pipe; and
- deforming the cleaning element by passing between a set of at least two mechanical rollers.

\* \* \* \* \*